Jan. 27, 1970      D. I. HOVEY      3,492,671

APPARATUS FOR CHEMICAL ADDITION OF GAS TO LIQUID SOLVENT

Filed March 26, 1968

INVENTOR
DANIEL I. HOVEY

BY *Wilfred G. Caldwell*

ATTORNEY

United States Patent Office 3,492,671
Patented Jan. 27, 1970

3,492,671
APPARATUS FOR CHEMICAL ADDITION OF GAS TO LIQUID SOLVENT
Daniel I. Hovey, Annandale-on-Hudson, N.Y. 12504
Filed Mar. 26, 1968, Ser. No. 716,181
Int. Cl. A23f; A23l 1/00
U.S. Cl. 99—275　　　　　　　　　　　　　　7 Claims

ABSTRACT OF THE DISCLOSURE

This invention relates to apparatus for chemically adding a gas to a liquid solvent, while precluding byproducts of the reaction from entering the solvent.

---

Figure 2:
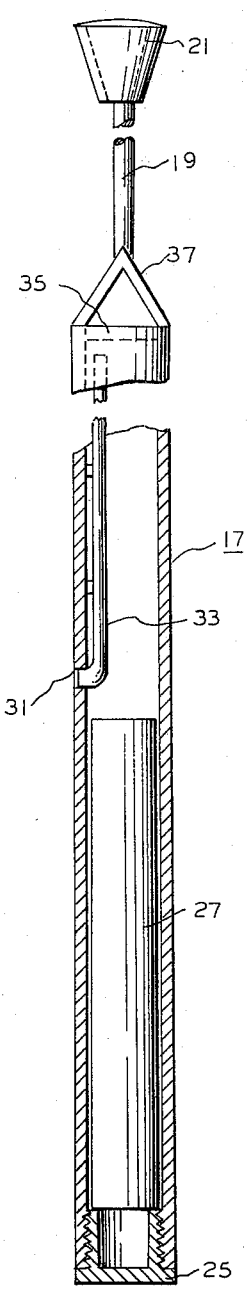

The primary purpose of the invention is to provide for the production of flavored and non-flavored carbonated beverages, by the individual, using plain tap water in the home. A cylindrical elongated hollow member includes a removable cap in one end through which a compressed bar of powdered chemicals, such as sodium bicarbonate and citric acid may be inserted with the plug or cap sealing the elongated member against the liquid solvent (water in this example).

The other end of the elongated member includes a filter such as water-proofed fritted (sintered) glass which will permit the escape of carbon dioxide in small streams but preclude water entering therethrough.

This end of the elongated member is extended by struts and a rod to a stopper, preferably of the safety type for closing the vessel in which the unit is immersed in water.

The hollow member includes a hole between its ends and an internal tube in communication with the hole, extending upwardly to terminate near the fritted glass. This tube permits solvent to enter the elongated member to initiate the chemical reaction, but very substantially precludes byproducts from leaving the enclosed elongated member. Thus, basically only the carbon dioxide is liberated to carbonize the water, with the reaction taking only about two minutes. Removal of the elongated member removes the byproducts of the reaction, and hence provides a pure and tasty carbonated water which may be flavored as desired, because the distasteful sodium citrate is removed with the elongated member. The flavor syrup or concentrate is preferably added to the water before the reaction is started.

The same apparatus will produce beer through the addition of syrup, derived from a flash evaporation processing of beer, along with alcohol added to the water in the vessel prior to carbonization. Thus, the production of beer may be achieved by campers many miles from civilization, where the water source is excellent and plentiful.

The real advantages of the invention reside in the production of carbonated beverages by the individual from ordinary tap water at low cost for immediate consumption or storage. The product is pure without being impaired by distasteful byproducts. The reaction is rapid, but the apparatus need not be removed immediately. Because of the structure, diffusion of the byproduct into the carbonated beverage is extremely slow. The apparatus requires only minimal displacement in the vessel, which may be an ordinary quart bottle with a safety stopper. For example, the apparatus may comprise an elongated hollow tubular member 20 cm. in length and 1.6 cm. in diameter employing a compressed powdered bar 10 cm. in length by 1.1 cm. in diameter to carbonize one quart of fluid at a cost of approximately 1.5 cents for the chemicals.

With the foregoing in mind, it is among the objects of the invention to provide a novel apparatus for carbonizing consumable beverages.

Another object of the invention is the provision of such apparatus which precludes byproducts of a chemical reaction from entering the fluids, while permitting only the desired gases to reach the fluids surrounding the apparatus.

Another object is the provision of such apparatus incorporating filter means for preventing the fluid, such as water, from entering the apparatus while enabling the gas, such as carbon dioxide, to escape as small streams, so it will go into solution with the water.

Finnally, another object of the invention is the provision of such apparatus and a method for carbonating water, including a concentrate derived from beer with re-added alcohol to produce beer at a remote location.

Figure 1:
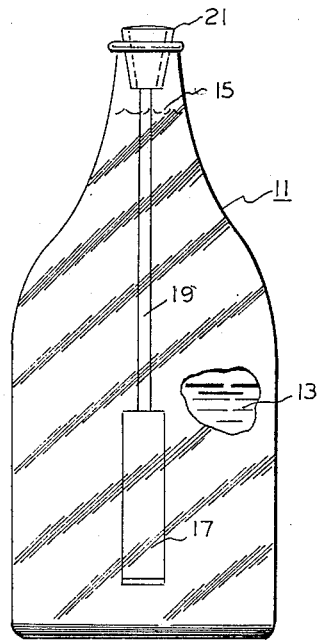
Figure 3:
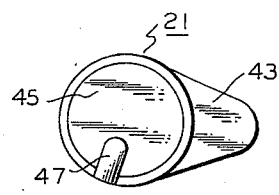

Referring now to the drawings, the invention will be explained in detail in connection therewith, wherein:

FIGURE 1 is a view in elevation of a vessel, such as a quart bottle, with the apparatus in place for use with the fluid therein, FIGURE 2 is a view partly in section and partly in elevation of the apparatus of the invention, and FIGURE 3 shows one suitable safety type stopper for incorporation with the invention.

Referring now to FIGURE 1, it will be seen that a vessel 11 which may be of any size, content or shape is substantially filled with a fluid 13, usually water, to a level 15 for treatment or carbonization. The hollow tube member is generally shown at 17 immersed in fluid 13 and supported by rod 19 with stopper 21 provided to close vessel 11.

In FIGURE 2, the hollow elongated tubular member 17 is shown in greater detail as preferably constructed of a rust-proof material, e.g. stainless steel, which will not enter into the reaction or impair the taste of the carbonated beverage. By way of example only, for carbonizing the contents of a quart bottle or container, the member 17 may have a length of approximately 20 cm., an outside diameter of approximately 1.6 cm. and an inside diameter of approximately 1.2 cm. The lower end is threaded to receive a threaded plug or cap 25 adapted to seal member 17 in fluid-tight relation against the water 13. This cap is removable in order that a compressed cylinder 27 of chemicals for the chemical reaction may be inserted therein and any residue or by-products removed and discarded in the cleaning process after the member 17 has been withdrawn from bottle 11, following completion of the reaction.

This bar of compressed powdered chemicals, in the example above, may have a length of approximately 10 cm. and a diameter of approximately 1.1 cm. It is made from a mixture of sodium bicarbonate and citric acid.

The tubular member 17 includes an opening or hole 31, between its upper and lower ends, and preferably a substantial distance beneath the upper end. There is disposed a tube or conduit 33 in communication with hole 31 and extending upwardly to terminate in the vicinity of the circular disc or filter 35. The preferred filter is waterproofed fritted (sintered) glass in liquid-tight relation with member 17, in order to permit carbon dioxide from the reaction to pass into water 13, but to preclude water 13 from passing through filter 35. Thus, the only liquid communication between the interior of member 17 and the water 13 is via tube 33 which normally is under sufficient water pressure as to preclude the carbon dioxide and/or any byproducts from passing therethrough externally of member 17.

For supporting the apparatus 17 in the vessel 11, a plurality of struts 37, two or more, extend upwardly from the top of member 17 and thence via a common rod 19 to a stopper 21, which for ordinary bottles should be of a safety type. However, stopper 21 need not be of the safety type when stainless steel or heavy duty vessels are employed.

While most conventional safety stoppers will serve for stopper 21, a simple and inexpensive type is shown in FIGURE 3, wherein the stopper comprises a partly hollow rubber plug or base 43 and an aluminum seal or cover 45, sealed thereto, and in communication with the pressure of vessel 11 via one or more openings through the rubber base 43. The aluminum cover or seal is provided with a weakened tubular portion 47 adapted to rupture at a pressure less than the fracturing pressure for vessel 11. Also, preferably the stopper 21 removably engages rod 19 for replacement if rupture occurs. Resettable stoppers may be employed in lieu of stopper 21.

In the example given, the reaction time may comprise 1½ to 2 minutes, after which the apparatus may be removed and the vessel 11 re-stoppered for future use. Alternatively, the apparatus 17 may remain in the vessel 11 for up to several hours without undue contamination of the products by conduit 33, because diffusion therethrough is quite slow.

If a flavored carbonated beverage is desired, the particular flavored syrup is added in desired amounts to the contents of the vessel 11, preferably prior to carbonization.

The advantages of the invention in making carbonated water or flavored beverages at home at low cost may also obtain for campers at remote locations, the production of beer from mountain stream or lake water with this apparatus constituting an additional advantage of outdoorsmen. Ordinary beer is concentrated by flash evaporation processing to remove most of the water and to leave a syrup or concentrate for reconstituting the beer. This syrup is mixed with a suitable amount of alcohol (e.g. 95% EtOH) and added to the fresh water in vessel 11 for carbonization.

Since the apparatus, beer syrup, and pure alcohol require relatively small space for reconstituting a large quantity of beer, the advantages of the invention at remote locations may be appreciated.

While the invention has been explained in connection with a preferred form in particular applications, it should be mentioned that the principles thereof provide for other and further applications and it is intended that the invention be limited only by the appended claims, for it should be obvious to those skilled in the art that other chemicals and solvents may be used to produce other end products.

By way of example, calcium sulfide may be used wherein a solution saturated with hydrogen sulfide is needed. Other examples where liquid saturated with gases is desired will readily be apparent, using other ingredients and solvents.

What is claimed is:

1. Apparatus adapted to contain chemicals for immersion in solvent contained in a vessel to effect a chemical reaction therewith comprising in combination, an elongated hollow member having dimensions to fit within the vessel, means for releasably closing one end of said member whereby said chemicals may be inserted into the member and the member closed, filter means adapted to close the other end of the elongated member against entry of the solvent therethrough, said filter means characterized by being permeable to gases generated in said chemical reaction, at least one hole in said hollow member between the ends thereof, a tubular member disposed within said hollow member in communication with said hole and extending upwardly to terminate short of the filter means for permitting solvent to enter the hollow elongated member and initiate the chemical reaction and means for retrieving the hollow elongated member from the vessel of solvent.

2. The apparatus of claim 1 wherein the means for retrieving the elongated member comprise struts attached to the elongated member adjacent the end containing the filter means, a rod-like extension from the struts, and stopper means affixed to the rod-like extension means for closing the vessel.

3. The apparatus of claim 2 wherein said filter means comprises liquid-proofed fritted glass sealed to the elongated member in liquid-tight relation therewith.

4. The apparatus as claimed in claim 3 wherein said stopper means comprises a safety stopper adapted to release pressure below the fracturing pressure of the vessel.

5. The apparatus of claim 4 wherein said solvent is water, said chemicals comprise a dry mixture of sodium bicarbonate and citric acid, and said filter means passes carbon dioxide gas from said reaction into the water contained in the vessel but precludes entry of water therethrough.

6. The apparatus of claim 5 wherein said elongated member displaces approximately 5% of the vessel and said chemicals are included in the displacement and account for about ½ thereof.

7. The apparatus of claim 4 adapted to make beer wherein said chemicals comprises sodium bicarbonate and citric acid, and further comprising a concentrate made from beer and a quantity of alcohol added to water in said vessel to produce beer upon carbonization by said chemical reaction.

References Cited

UNITED STATES PATENTS

| 2,073,273 | 3/1937 | Wetstein | 99—275 |
| 2,591,990 | 4/1952 | Wisdom | 261—121 |
| 2,631,521 | 3/1953 | Atkins | 99—275 |
| 2,805,846 | 9/1957 | Dewan | 261—121 |

ROBERT W. JENKINS, Primary Examiner